(12) United States Patent
Eggers et al.

(10) Patent No.: US 9,529,357 B1
(45) Date of Patent: Dec. 27, 2016

(54) METHOD AND APPARATUS FOR OPERATOR SUPERVISION AND DIRECTION OF HIGHLY AUTONOMOUS VEHICLES

(71) Applicant: The United States of America as represented by the Secretary of the Air Force, Washington, DC (US)

(72) Inventors: Jeffrey Eggers, Leesburg, VA (US); Mark Draper, Beavercreek, OH (US); Robert Shaw, Beavercreek, OH (US); Joshua Hamell, San Marcos, CA (US); Heath Ruff, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/298,992

(22) Filed: Jun. 9, 2014

Related U.S. Application Data

(60) Provisional application No. 61/835,860, filed on Jun. 17, 2013.

(51) Int. Cl.
*G05D 1/00* (2006.01)

(52) U.S. Cl.
CPC ........... *G05D 1/0011* (2013.01); *G05D 1/0027* (2013.01)

(58) Field of Classification Search
CPC ........... G05D 1/00; G07C 5/008; H04B 10/00; H04L 69/08; G06F 9/45; H04H 47/26; B64C 19/00; B64C 2201/02; B64C 2201/126; B64C 2201/141; B64C 2201/146; B64C 39/024

(Continued)

(56) References Cited

U.S. PATENT DOCUMENTS

| 8,694,184 B1 * | 4/2014 | Boorman ............... G01C 23/00 340/945 |
| 2008/0088185 A1 * | 4/2008 | Bell et al. ..................... 307/117 |

(Continued)

FOREIGN PATENT DOCUMENTS

EP          0743599 A2 *   1/1996

OTHER PUBLICATIONS

Calhoun, G., Draper, M., Miller, C., Ruff, H., Breeden, C., Hamell, J., Adaptable automation interface for multi-unmanned aerial systems control: Preliminary usability evaluation, Proceedings of the Human Factors and Ergonomics Society, Sep. 2013.

(Continued)

*Primary Examiner* — Nga X Nguyen
(74) *Attorney, Agent, or Firm* — AFMCLO/JAZ; Jason Sopko

(57) ABSTRACT

A system for automating the control of a Remotely Piloted Vehicle (RPV) includes a computer having a processor and a memory, a display operatively coupled to the computer and configured to display a future operating condition of the RPV and an input device operatively coupled to the computer. A predicted noodle tool is executed by the processor and configured to indicate a predicted future path of the RPV by generating a predicted noodle segment on the display. A directed noodle tool is executed by the processor to indicate a pilot-adjustable proposed future flight path of the RPV by generating a directed noodle segment on the display. Further, an input device mode selector is operatively coupled to the processor and configured to selectively map the input device to either manipulate a control surface of the RPV, or to manipulate the directed noodle segment.

8 Claims, 8 Drawing Sheets

(58) Field of Classification Search
USPC .................................... 701/300–302, 1–3
See application file for complete search history.

(56) References Cited

U.S. PATENT DOCUMENTS

| | | | |
|---|---|---|---|
| 2009/0232506 A1* | 9/2009 | Hudson et al. | 398/106 |
| 2010/0305781 A1* | 12/2010 | Felix | 701/3 |
| 2012/0280087 A1* | 11/2012 | Coffman | G05D 1/0044 244/175 |
| 2014/0079053 A1* | 3/2014 | Gallimore et al. | 370/350 |

OTHER PUBLICATIONS

Calhoun, G., Ruff, H., Breeden, C., Hamell, J., Draper, M., Miller, C., Multiple remotely piloted aircraft control: Visualization and control of future flight path, Human Computer Interaction International (HCII), Jul. 2013.

Miller, C.A., Hamell, J., Barry, T., Ruff, H., Draper, M.H., & Calhoun, G.L., Adaptable operator-automation interface for future unmanned aerial systems control: Development of a highly flexible delegation concept demonstration. AIAA Infotech Aerospace Conference, Jun. 2012, AIAA-2012-2529, 1-21.

Calhoun, G., Draper, M.H., Ruff, H., Barry, T., Miller, C.A., & Hamell, J. (Jun. 2012), Future unmanned aerial systems control: Feedback on a highly flexible operator-automation delegation interface concept, AIAA Infotech Aerospace Conference, Jun. 2012, AIAA-2012-2549, 1-16.

* cited by examiner

METHOD AND APPARATUS FOR OPERATOR SUPERVISION AND DIRECTION OF HIGHLY AUTONOMOUS VEHICLES

Pursuant to 37 C.F.R. §1.78(a)(4), this application claims the benefit of and priority to prior filed Provisional Application Ser. No. 61/835,860, filed 17 Jun. 2013, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to apparatus and methods for controlling remotely piloted vehicles and, more particularly, to apparatus and methods for future route planning and execution of one or more remotely piloted vehicles.

BACKGROUND OF THE INVENTION

The success of Remotely Piloted Aircraft (or RPA) and Remotely Piloted Vehicles (RPVs) in recent military operations has led to increased interest in their capabilities and application to a variety of military missions (as well as civilian applications). For purposes of discussing this art area, terms such as "Remotely Piloted Aircraft," "Unmanned Aerial Vehicle," "Remotely Piloted Vehicle," and "Highly Autonomous Vehicle" may be used interchangeably. Further, the art is equally applicable to aircraft, ground-based vehicles, and watercraft.

It should be noted that while the nomenclature "Unmanned Aerial Vehicles" (UAV) has been associated with this technology area, using the term "unmanned" is somewhat imprecise. Although the pilot is no longer onboard the platform, there remains a critical need for human involvement in order for RPVs or RPAs to successfully perform missions. This is especially true for the tactical reconnaissance and close air support mission areas where tasks are often time critical, many relevant mission inputs and contextual parameters are not digitized, target/friendly/non-combatant identification is complex and variable, and mission objectives and conditions on the ground vary constantly. RPV operators in these difficult, time sensitive mission areas will soon be expected to supervise multiple RPVs at the same time, requiring advances in management of mission critical information and aircraft control system.

Operational concepts in which a single pilot is responsible for multiple RPVs will necessarily involve supervisory control with requirements for the pilot to frequently shift attention between vehicles. Displays that facilitate rapid retrieval of each RPV's state and associated tasking are required. Moreover, new control methods will be necessary. Although each vehicle's flight will be highly automated to function in multi-RPV applications, the pilot will still need to interact with supporting automation systems and, at times, temporarily take direct manual control of an individual vehicle. This is due to the highly dynamic nature of missions and the need for pilots to be able to apply added value or understanding of the situation to otherwise automated decision processes. For example, there will be times when the pilot will have contextual information not available to the supporting automation and the pilot will need to make a quick redirection of an RPV's flight path.

To succeed in an environment wherein a single pilot is responsible for the direction of a plurality of RPVs, a system must allow the pilot to direct future motion of a given RPV so that his attention may be subsequently directed to managing other tasks. Current methods to establish future path of vehicle movement are either too limited (e.g., employing fixed holding pattern) or require numerous selections to route planning systems (e.g., establishing future waypoints to navigate). Such input methods are too rigid (resulting in a coarse path description, typically consisting of linear path segments connected by waypoints) or too time consuming when it is desirable to quickly designate future vehicle paths. While efficient and precise future direction of RPVs is desirable in a single vehicle environment, the benefits are amplified in the envisioned applications wherein operators' attention is divided across multiple highly autonomous vehicles.

Therefore, there exists a need for methods and apparatus to facilitate rapid, precise, and highly configurable simultaneous operation of a plurality of RPVs by a single pilot.

SUMMARY OF THE INVENTION

The present invention overcomes the foregoing problems and other shortcomings, drawbacks, and challenges of simultaneously controlling a plurality of remotely piloted vehicles. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a system for automating the control of a Remotely Piloted Vehicle (RPV) is provided. The system includes a computer having a processor and a memory, a display operatively coupled to the computer and configured to display a future operating condition of the RPV and an input device operatively coupled to the computer. A predicted noodle tool is executed by the processor and configured to indicate a predicted future path of the RPV by generating a predicted noodle segment on the display. A directed noodle tool is executed by the processor to indicate a pilot-adjustable proposed future flight path of the RPV by generating a directed noodle segment on the display. Further, an input device mode selector is operatively coupled to the processor and configured to selectively map the input device to either manipulate a control surface of the RPV, or to manipulate the directed noodle segment.

According to another embodiment of the disclosed invention, a method of controlling a Remotely Piloted Vehicle (RPV) in a system including a computer having a processor and a memory, a display operatively coupled to the computer and configured to display a future operating condition of the RPV, and an input device operatively coupled to the computer is provided. The method includes generating on the display a predicted noodle segment indicative of a predicted future path of the RPV, and flying the RPV with an autopilot to conform to the predicted future path corresponding to the RPV. The method also includes generating on the display a directed noodle segment indicative of a proposed future path of the RPV, and using an input device mode selector to map the input device to manipulate the directed noodle segment. The method further includes manipulating the directed noodle segment with the input device into a desired future path, and committing to the desired future path by actuating a confirmation switch.

According to yet another embodiment of the disclosed invention, a method of controlling a first Remotely Piloted Vehicles (RPV) and a second RPV, in a system including a computer having a processor and a memory, a display operatively coupled to the computer and configured to display a future operating condition of the RPV, and an input device operatively coupled to the computer is provided. The method includes generating on the display a predicted noodle segment indicative of a predicted future path of the first RPV or the second RPV, and flying the first RPV or the second RPV with an autopilot to conform to the predicted future path corresponding to the first RPV or the second RPV. The method also includes generating on the display a directed noodle segment indicative of a proposed future path of the first RPV or the second RPV, and using an input device mode selector to map the input device to manipulate the directed noodle segment corresponding to the first RPV or the Second RPV. The method further includes manipulating the directed noodle segment corresponding to the first RPF or to the second RPF with the input device into a desired future path, and committing to the desired future path by actuating a confirmation switch.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
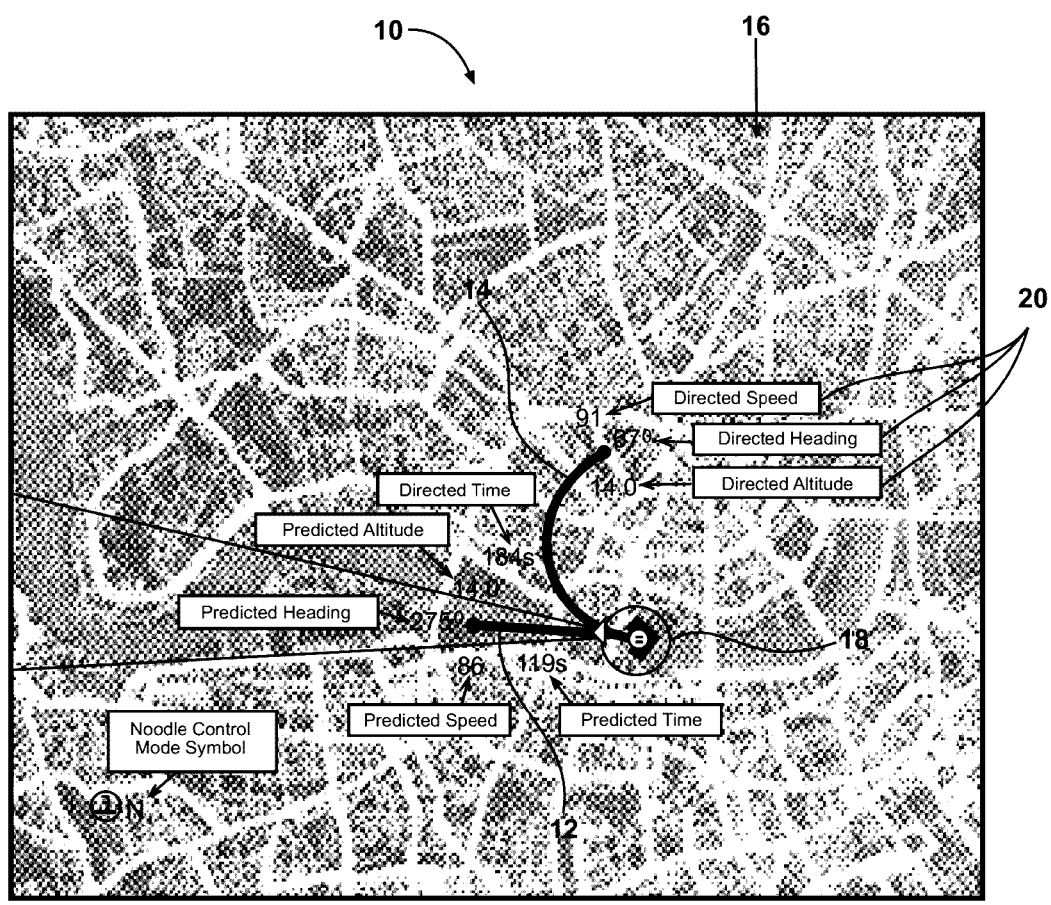
FIG. 1 is an illustration depicting predicted noodles, directed noodles, and other symbologies in accordance with an embodiment of the disclosed invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The invention disclosed herein allows vehicle operators to selectively allocate input devices between either real-time control of the vehicle, or to a new modality that graphically specifies a desired future path of the vehicle. The future path specification is rapid and allows arbitrary radius curves (to include straight-line paths) to be joined end-to-end, resulting in a far more precise and flexible configuration and adjustment of a desired future vehicle path. Particularly in applications in which operators' attention is divided across multiple other tasks (such as in control of multiple highly autonomous vehicles), this method enables control of a vehicle's near future path in situations that were previously rendered infeasible by pilot task saturation. In the disclosed invention, the resultant commanded path is progressively displayed to the operator as it is built, allowing adjustment at any point. Once the symbology and geometric indicators define the desired future path, the operator approves the path, and a vehicle controller reprograms the vehicle's future route.

The disclosed invention provides functionality when rapid vehicle re-routing is required and it enables single operator supervision of multiple highly-autonomous air, ground, and seagoing vehicles, especially when high communication/datalink latencies exist between operator and vehicle. The disclosed invention may also have utility in manned flight in more complex next generation air traffic environments.

The invention described herein provides methods and apparatus that enable a pilot to visualize and quickly command the near-term future flight path of a vehicle. The system includes presenting symbology and geometric indicators on a display, and the system recognizes inputs that the pilot/operator makes using the ground station's existing controllers (to include manipulation of the throttle and stick). This interface is termed a "noodle," as its symbology and geometric indicators include a flexible line segment resembling a variable length bendable noodle emerging from the nose of a vehicle symbol on a map display. The invention employs two different noodle symbology sets; a predicted noodle and a directed noodle that will be explained in detail below.

In the description that follows, specific reference may be made to a particular apparatus or method for inputting information in accordance with an embodiment of the disclosed invention. Additionally, the description may specify that data is presented to a user or pilot in a specific media, format, or modality. However, it will be understood that any of a plurality of input devices known to one of ordinary skill in the art may be substituted for a specified input device, to include, by way of example, keyboard, mouse, trackball, voice recognition, optical tracking, brain-computer interface, or the like. Additionally, information may be presented to the user via heads up display, monitor, haptic feedback, holograph projection, or the like.

Turning attention to FIG. 1, a system 10 having both predicted noodle 12 and directed noodle 14 symbology sets for a RPV application are shown on a display 16. The predicted noodle 12 consists of a line (colored to match the respective vehicle symbol 18) that extends from the vehicle symbol 18 and is presented to show the forecasted flight path the RPV will fly. The path of the predicted noodle 12 assumes that the current state of the RPV control inputs is maintained. By employing faster-than-real-time software simulations that model the actual RPV, the RPV's position is predicted on the display 16 as a series of points in the future based on a detailed snapshot of the actual current flight state, as well as based on current commanded inputs (waypoint flight, autopilot, vector, stick and throttle, etc.).

The points are then connected into a line segment that shows the expected flight path for a specified duration. Several alphanumeric values 20 are presented adjacent each variety of noodle (the predicted noodle 12, directed noodle 14). The example shown in FIG. 1 illustrates that at the end of the predicted noodle 12, the RPV will have traveled for 119 seconds and be at an airspeed of 86 KIAS, an altitude of 14,000 feet MSL, and be oriented at a heading of 275 degrees. In a simulated environment, these predictions are perfect, since the same model is used to predict aircraft path as is used to actually 'fly' it. In an operational environment, winds and other factors will introduce error and are compensated for by estimates and approximations. The presentation of the predicted noodle 12 can either be automatic or under pilot control (i.e., either visible on the display 16, or hidden from view).

The directed noodle 14 is a novel interface that serves as both a display symbology and control feature, enabling the pilot to quickly specify a proposed future path of a vehicle. When invoked, the functionality the directed noodle 14 is visualized with a "directed" path shown in addition to the predicted noodle 12. This directed noodle 14 is manipulated by the pilot's conventional stick 30 and throttle 32 (FIG. 2), but the functionality of the stick 20 and throttle 32 is temporally remapped to configure and adjust the directed noodle 14. In other words, while manipulations of the stick 30 and throttle 32 are commonly directed to either real-time control of the RPV (or near real-time if transmission delays are considered), the pilot may selectively reroute or remap the stick 30 and throttle 32 inputs to adjust the directed noodle 14 on the display 16. When the stick 30 and throttle 32 are mapped to control the directed noodle 14, manipulation of the stick 30 and throttle 32 have no immediate impact on the control surfaces of the RPV.

When remapped to control the directed noodle 14, inputs on the stick 30 specify the RPV's destination change in heading and altitude at the end of the noodle segment. For example, the Y axis of the stick 30 may be assigned to control directed noodle 14 destination altitude in lieu of adjusting real-time pitch. Likewise, the X axis may adjust the desired final heading of the directed noodle 14 in lieu of rolling the aircraft in real-time. A duration button 34 (FIG. 2) on the throttle 32 increases or decreases the directed noodle 14 duration, while movement of the entire throttle 32 fore and aft controls desired airspeed. Exact length of the directed noodle 14 is derived from directed noodle 14 duration and airspeed setting, using a simulation comprising a flight model of the aircraft under control. The specified future path of the aircraft is not carried out until the pilot pushes forward on a confirmation switch 36 on the throttle 32 to confirm the path. At this point, the parameters previously specified by the directed noodle 14 are communicated to the vehicle's flight management system and the RPV automatically applies the required parameters for execution of the directed noodle 14 path.

During the next state update from the physical RPV, the software supporting the predicted noodle 12 is informed of the now-executed directed noodle 14 segment and it re-calculates accordingly, effectively displaying a new predicted noodle 12 taking the place of the previous directed noodle 14. This vehicle near-term path visualization and control system 10 enables a very natural and intuitive method of operation, using the pilot's familiar flight controls to input a future flight path. Since the flight path is computed and shown using the same flight control algorithms used to control the aircraft itself, the new flight path obeys all known constraints of the RPV's real flight capabilities.

Figure 3:
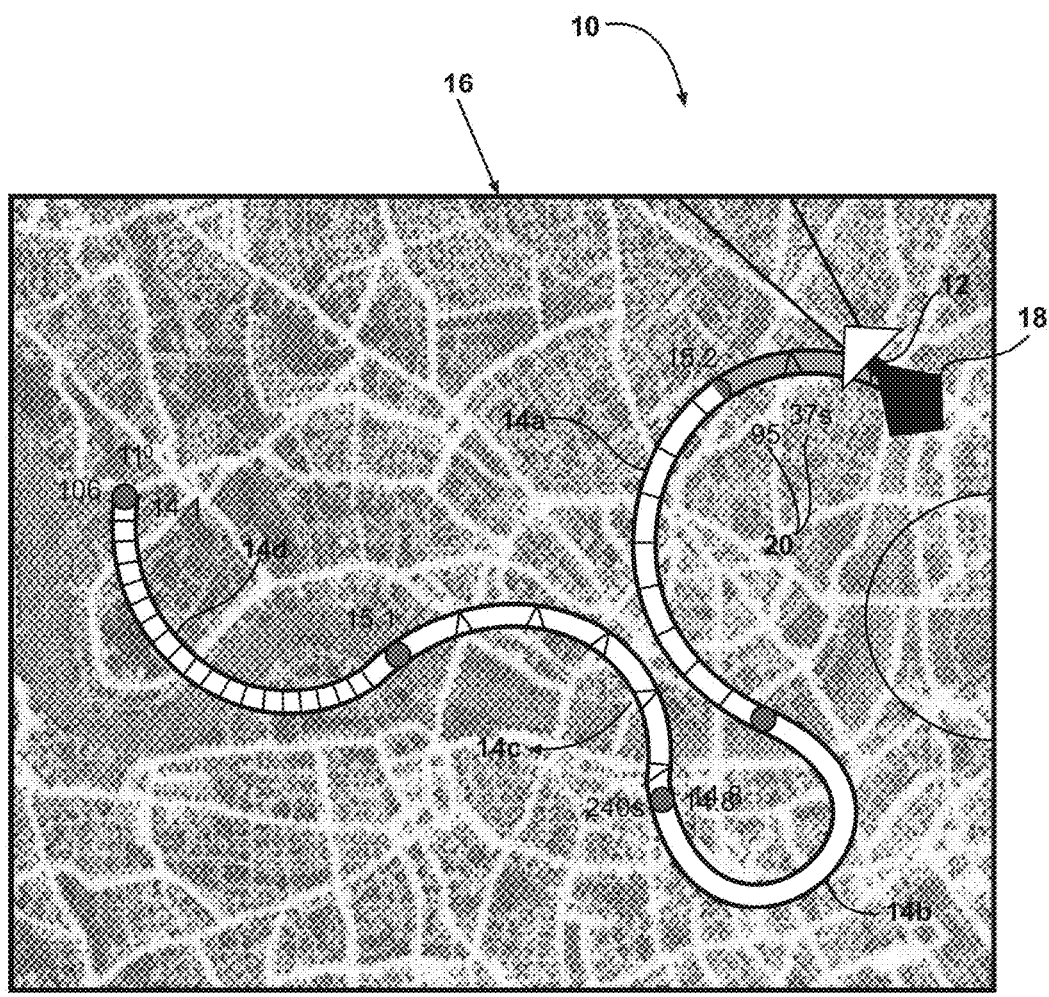
FIG. 3 is an illustration depicting a plurality of predicted and directed noodle segments that have been chained in accordance with an embodiment of the disclosed invention.

A new directed noodle 14 (also referred to as a noodle segment) can be added at the end of the accepted directed noodle 14, and manipulated for additional flight path specification. As seen in FIG. 3, multiple directed noodle segments 14a-14d can be "chained" together to command extended near-term flight maneuvers. Future segments can also be cancelled by pulling back on the confirmation switch 36. Each backward switch depression moves the currently manipulated directed noodle back one segment in the path. This allows for the pilot to redefine undesired directed noodle segments without discarding the entire sequence.

Figure 4:
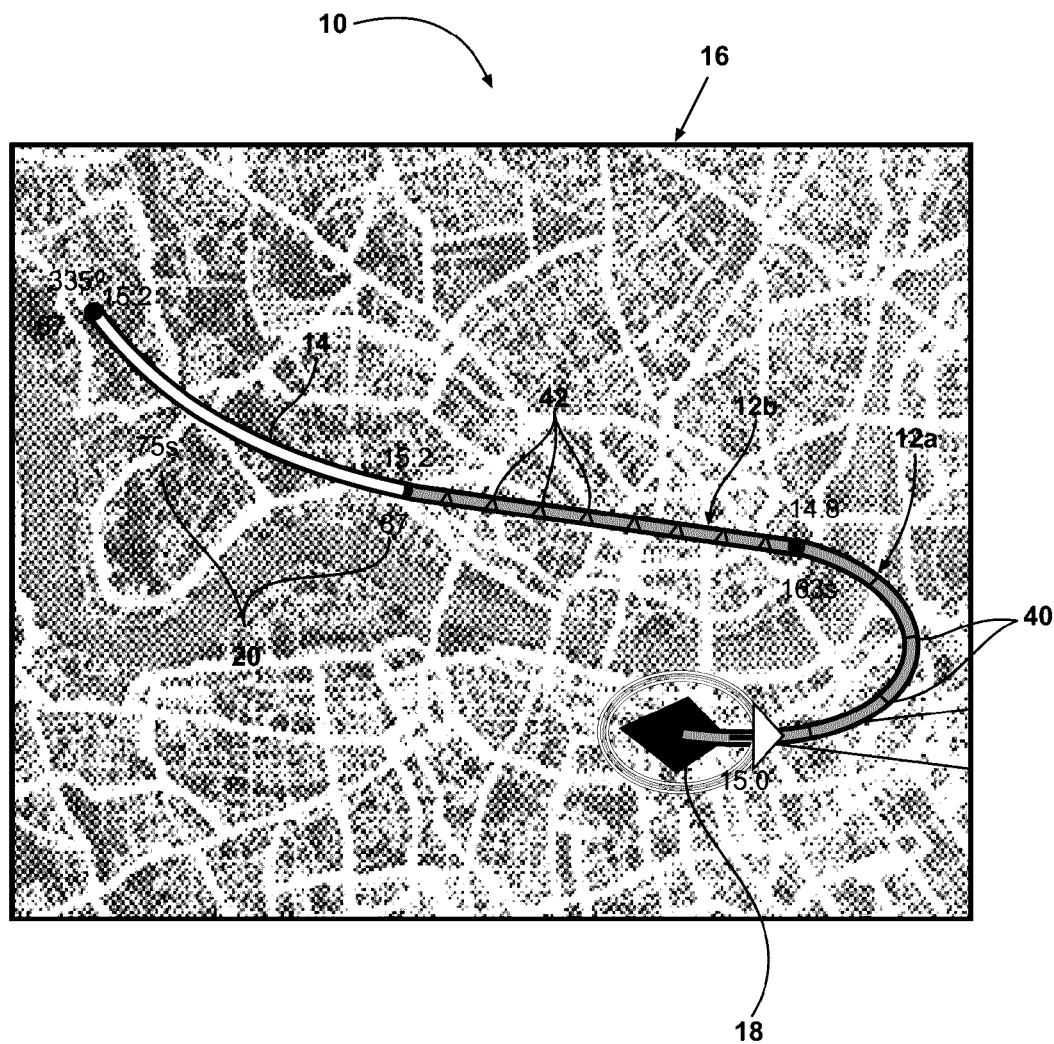
FIG. 4 is an illustration depicting symbologies indicative of changing altitude in accordance with an embodiment of the disclosed invention.

FIG. 4 (as well as FIG. 3) illustrates how both the direction and magnitude of altitude change are concurrently presented to the user. In FIG. 4, the RPV is approaching the start of two chained and established (i.e., predicted noodle 12) segments in which the predicted altitude will start at 15,000 feet. The RPV will travel over two predicted noodle segments 12a-12b in 163 seconds of flight time. The first predicted noodle segment 12a has the RPV descending, which is denoted by the hash-marks 40 (1 symbols) (or other descent indicator, to include color coding, ASCII characters, geometric shapes, shading, gradient fill, or the like) added in-line to the noodle symbology once for every 50 feet of descent, to reach an altitude of 14,800 feet at the start of the next segment. This next predicted noodle segment 12b has the RPV climbing, which is denoted by the carat symbol 42 (^) (or other climb indicator, to include color coding, other ASCII characters, geometric shapes, shading, gradient fill, or the like) added in-line to the noodle at every 50 feet of climb, directing the aircraft to climb to 15,200 feet (denoted by '15.2' on the display) by the end of the predicted noodle segment 12b. At this point, the chained predicted noodle segments 12a-12b have ended and the directed noodle 14 is made available for further manipulation in order to continue defining the near-future flight path.

The intuitive use of manual inputs by the pilot (employing the existing control station hardware of the stick 30 and throttle 32), along with supporting automation, provides a means of quickly specifying a vehicle's future path with more precise control and granularity without employing inflexible hold functions or detailed menus and procedures associated with complex route planning software. More importantly, the disclosed invention may enable a pilot to devote more dedicated attention to other tasks and vehicles under supervision.

The following description provides more detail on the apparatus and structures for use in performing the disclosed inventive method. In addition, features of the multi-RPV simulation testbed used to demonstrate and evaluate the invention are described.

Figure 5:
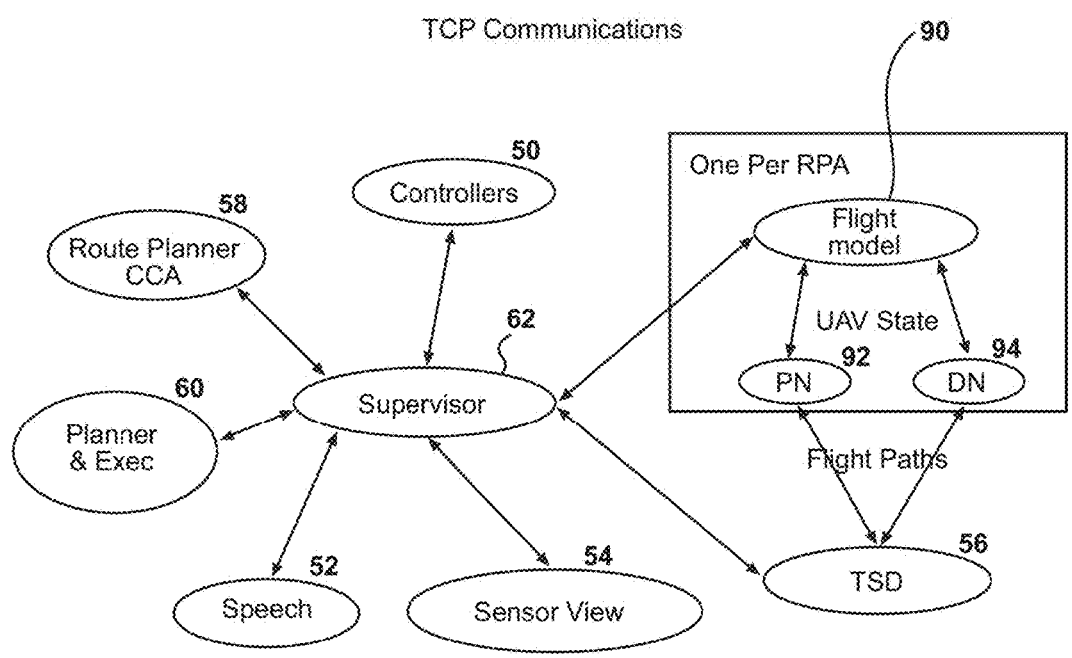
FIG. 5 is a chart depicting subsystems in accordance with an embodiment of the disclosed invention.

In one embodiment, shown in FIG. 5, TCP (Transmission Control Protocol) communications are used to connect controllers 50 (for example, stick 30 and throttle 32) inputs, speech module 52, a sensor view 54, Tactical Situation Display (TSD) 56, a route planner (CCA) 58, and a planner and exec module 60 to a software Supervisor 62. This Supervisor 62 acts as the central communication point for most of the processes. Components register on respective listening sockets, and send/receive messages to each other through this single point. The Supervisor 62 communicates with a plurality of flight models 90 (one per RPV), which generate predicted noodle 12 and directed noodle 14 symbologies using the predicted noodle tool 92 and directed noodle tool 94. These components are now described in further detail.

The Supervisor 62 acts as a central communication point for many of the processes. Components register on its listening socket, and send/receive messages to each other through this single point. The supervisor 62 also has served as central data collection point for experiment and test metrics. This component may serve as the scenario initialization piece, responsible for maintaining scripted events, loading RPV identities and initial locations, and the like. Further, the supervisor 62 may also manage some scenario functions, such as the save and load of screen configurations (which RPV is primary, etc.), playing sound files or notifications, and handling Decision Points.

Figure 6:
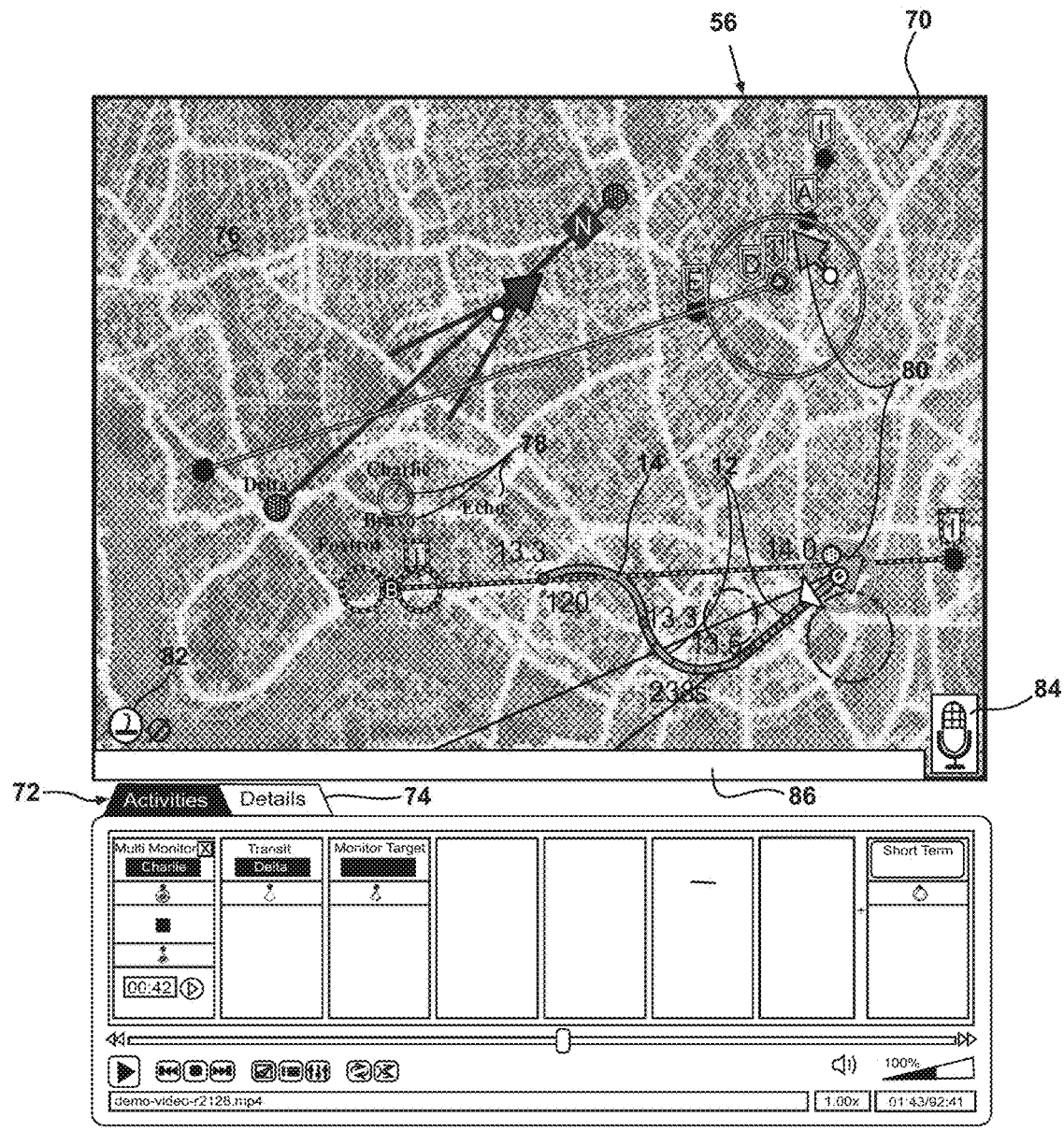
FIG. 6 is an illustration depicting a tactical display in accordance with an embodiment of the disclosed invention.
Figure 7:
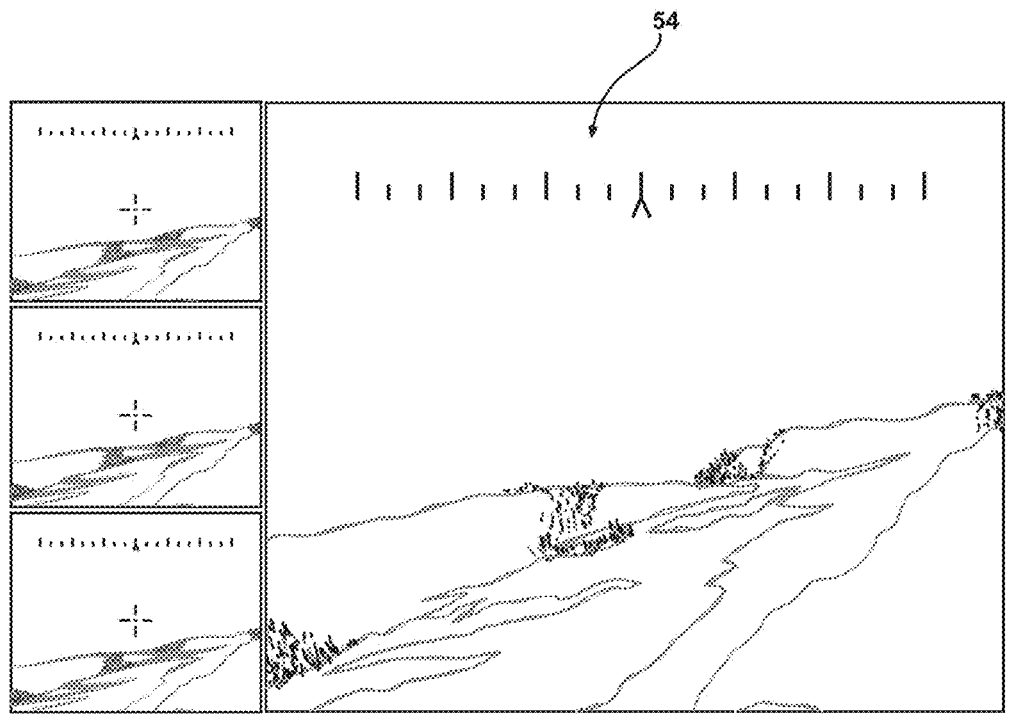
FIG. 7 is an illustration of a sensor view in accordance with an embodiment of the disclosed invention.

With respect to FIG. 6, the Tactical Situation Display (TSD) 56 provides three main functions: an overhead map view of the scenario, an activity window or panel for manipulating the play-level automation behaviors, and a static details panel for inspecting RPV or play instances.

Figure 2:
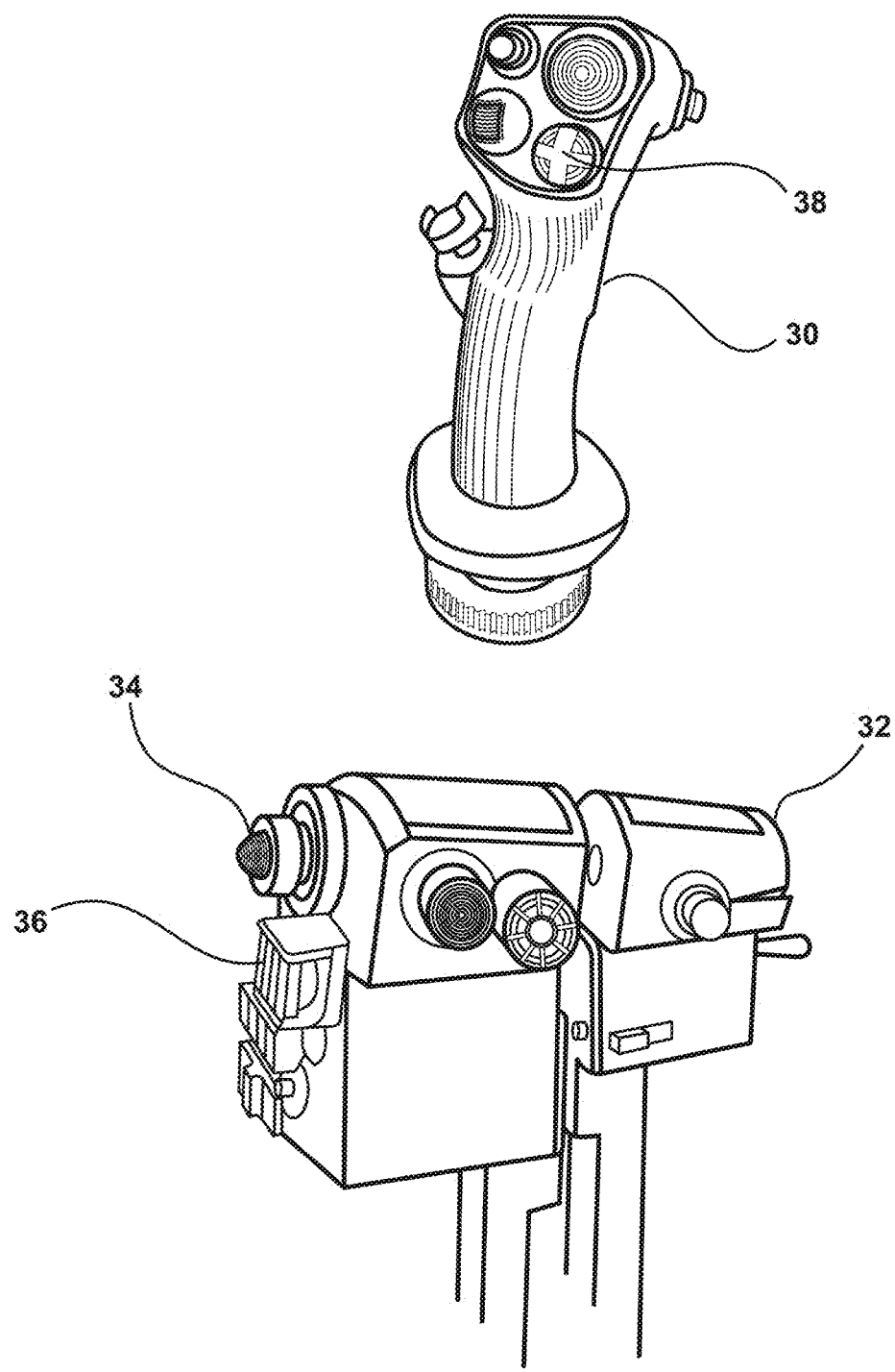
FIG. 2 is an illustration of input controllers in accordance with an embodiment of the disclosed invention.

The map view 70 may include a number of different components, to include: background map or imagery 76, waypoints 78 for automated flight, RPV icons 80, predicted noodles 12 and directed noodles 14. A context menu (not shown) may be actuated by a right mouse click or other designated input. Joystick mode icons 82 in the lower left, indicating the current joystick control mode (null/none, manual flight, sensor control, noodle definition, etc.). Mapping of the stick 30 may be changed, by way of example, from manual flight (movements of the stick 30 have a direct impact on control surfaces of the RPV) to noodle definition mode (movements of the stick 30 manipulate or adjust the directed noodle 14), by way of an input device mode selector 38 (FIG. 2). The lower right corner of the map view 70 may contain a microphone icon 84, indicating if the microphone is hot (i.e., actively listening for audio input). In conjunction with the microphone icon 84, the bottom of the map view 70 may display a text box 86 when the pilot is 'talking' to the system through the voice controls. The upper right hand corner may include a staleness meter 88 (providing feedback on task/mission/play status).

As shown in detail in FIG. 6, the activity window 72 of the TSD 56 allows the operator to instantiate mid and high level automation tasks, view the current status of the vehicles, or interact with existing commanded plays/missions. Also, the details panel 74 of the TSD 56 may provide the user with RPV and play/mission feedback that can be called up and overlaid on the Activity Window.

The sensor view 54 renders an out-the-window display from each of the RPVs. It may include a heading tape, but other head up display (HUD) references may be omitted. The view is not strictly forward-facing. The sensor view 54 follows the modeled sensor slew and pitch.

The controllers 50 may comprise a driver cooperating with a Thrustmaster® Warthog HOTAS (hands on throttle and stick) joystick and throttle package. The driver reads from the device and updates axis positions and button or switch actuations over the TCP communications. While the Thrustmaster® HOTAS Warthog provides acceptable results, it should be noted that controllers indicative of other airframes, or controllers designed for use with commercial gaming systems, may be substituted to achieve design objectives while accommodating pilot preferences.

The speech module 52 is an Air Force developed speech system that includes a DynaSpeak® recognition engine with a TTS (Text To Speech) engine. The speech module 52 may use UDP (User Datagram Protocol) wherein it is told to start listening, stop and process, stop and ignore, and 'say this'. From a user's spoken input, either recognized tokens or an error are received by the speech module 52. The speech module 52 is then responsible for processing the tokens and interpreting them as commands, determining whether they are appropriate for, or applicable to, a given server or scenario state, etc.

Figure 8:
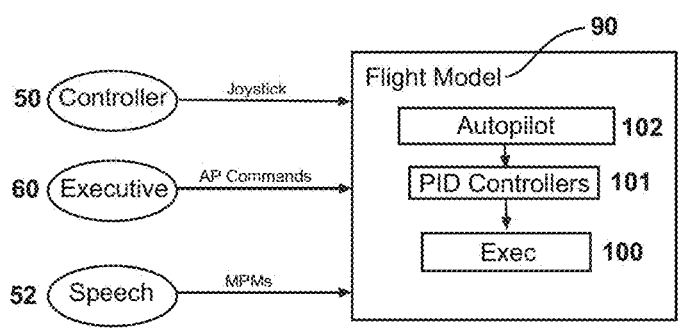
FIG. 8 is a chart depicting elements of a flight model in accordance with an embodiment of the disclosed invention.

The Flight Model 90 is an aero model with a PID (Proportional-Integral-Derivative) controller-based autopilot layered on top of it (FIG. 8).

The planner and executive 60 is a server responsible for the higher level behavior (e.g., plays) within the testbed. The planner and executive 60 interacts with a route planner 58 for route and path requests There are two Noodle tools; the predicted noodle tool 92 and the directed noodle tool 94. The predicted noodle tool 92 takes the current RPV state, including autopilot, and outputs to the display 16 and TSD 56 the flight path expected for the near future. Likewise, the directed noodle tool 94 uses the input from the stick 30 and throttle 32 to define an autopilot function, and it produces the output to the TSD 56 as if a copy of the current vehicle were to attempt that maneuver (or series of maneuvers).

The system 10 relies on two communication mechanisms. UDP is used for telemetry data sent from the executing RPV flight models 90, and TCP is used elsewhere. The vast majority of the TCP communication are routed through the central supervisor process 62. It is responsible for echoing each message (INT type, INT size, +byte[ ] payload) to all listeners. A handful of standard functions on the receiving end may handle parsing and interpretation of the messages.

The noodle communication paths are configured differently. The approach copies a large quantity of state information, very frequently, in order to minimize latency while not flooding the 'standard' communication channel. The noodle communications were therefore moved over to dedicated TCP connections. Likewise, the flight path updates (predicted noodles 12 and directed noodles 14 themselves) are done similarly between the predicted noodle tool 92, directed noodle tool 94, and the TSD 56 that displays those paths.

The flight model 90 used in the testbed contains an executive 100 with layered PID controller 101 and autopilot 102 on top of it. The flight model 90 accepts inputs from a number of different sources. When the RPV is in manual flight mode, it responds to the stick 30 and throttle 32 input by changing the aileron, elevators, etc., before stepping through each update increment. If the RPV is under automation control, the planner and executive 60 will be uploading waypoint sequences, index targets, and so on. Lastly, the pilot may be engaging in some short term automation behaviors through the use of Micro Play Maneuvers (MPMs), by speech or activity window 72. MPMs are short term (<60 seconds) maneuvers that the pilot can initiate in an automated manner. These include both target referential (e.g., "change my heading relative to this named target") and self-referential ("change altitude to X," "heading to Y," "hook counter clockwise," etc.). They may also include some simple fly-to-location-and-loiter behaviors. Lastly, each directed noodle segment 14, once executed, is technically an MPM. Though, for purposes of this discussion, it is generally considered a distinct automation mode.

The flight model 90 loop operates as follows: first, read all inputs over the TCP communications. Some of these may instruct the autopilot 102 to load a waypoint sequence, fly an MPM, set a target waypoint, load a series of directed noodle segments 14 for execution, and so on. If the RPV is under some level of autopilot 102 control, the PID controllers are used to provide control surface inputs. If the RPV is under manual control, the joystick 30 and throttle 32 state are used to provide control surface inputs. The flight model 90 is stepped forward in time one tick (e.g., 0.01 seconds). A new state is sent to the state cache (used for predicted noodle 12 updates), and if enough ticks have gone by, a subset of the full state (mostly just xyz/hpr (heading, pitch, roll) coordinates and airspeed) are sent to all components. This allows the sensor view 54 to update the RPV viewpoint, TSD 56 to update the RPV position, etc.

The predicted noodle tool 92 takes a copy of an executing flight model 90, runs it forward in simulation time, and produces the resulting flight path. The shape of the predicted noodle 12 components is a separate running process. Effectively, it is an outer loop around an isolated flight mode 90 instance. The predicted noodle 12 can be turned on/off externally by a voice command or physical interface. The predicted noodle tool 92 takes flight model 90 state/snapshots from a running flight model 90, and includes all physical state data (coordinates, orientation, etc.), internal characteristics (moments of inertia, math calculations), and the current autopilot 102 state (waypoint flight execution, MPM commands, PID states, etc.). At the start of each loop, this fresh state is loaded into the inner flight model 90 instance. The predicted noodle tool 92 runs that flight model 90 forward a fixed number of seconds (for example, 60 seconds) in simulation time. Due to the efficiency of the flight model 90, this takes a fraction of a second. During that execution, the predicted noodle tool 92 is responsible for taking positional snapshots every N seconds. This includes xyz coordinates, heading, pitch, and roll, and so on. Once the execution is complete, the data are assembled into a sequence/vector. Those positional sequences are broadcast to the TSD 56, where they are drawn as a curve (noodle) on top of the map view 70. With moderate hardware performance, it is typically possible to execute 10-15 minutes worth of simulation time within each loop in about 0.1 seconds.

The directed noodle tool 94 is an extension of the predicted noodle tool 92. Instead of blindly executing whatever current autopilot 102 state exists, it instead instructs a series of directed noodle segments 14 be flown. The directed noodle 14 is a desired change in RPV state, and it includes a requested change in heading, altitude, airspeed for the duration of the maneuver, as well as the duration of the maneuver itself. The autopilot 102 segments the overall duration up into tiny chunks, and tries to direct the aircraft to change its heading and altitude in equivalently small increments. This is how the system 10 attains a smooth curve from start to finish. There may be perturbations during the start of the maneuver if the aircraft is currently banking/etc., but those smooth out. The directed noodle 14 is a request, and it may not be possible for the aircraft to accomplish the path and end state that has been directed. By running the sequence through the directed noodle tool 94 before actual flight, the pilot is shown the exact path the aircraft will take when it tries to fly the request.

In one embodiment of the disclosed invention, a change in heading is mapped by the stick 30 X axis, change in altitude by the Y axis, throttle 32 position indicates airspeed, and toggling up/down on the throttle 32 duration button 34 will increment or decrement the duration.

So, much like the predicted noodle 12, the directed noodle 14 outer loop 'flies' forward in simulation time, plotting where the RPV will be for the duration. This is rendered on the TSD 56 (map view 70). The pilot can use a throttle 32 confirmation switch 36 to 'commit' the directed noodle segment 14, wherein that directed noodle segment 14 definition is sent to the 'real' autopilot 102 for execution. The pilot may then start defining the next directed noodle segment 14, and so on. By this mechanism, a number of different sequential curves can be defined.

Some embodiments of the disclosed invention may be configured to display projected noodles 12 and directed noodles 14 in 3-dimensions if augmented over the pilot's OTW (Out-The-Window) view or if a VSD (Vertical Situation Display) supplements the TSD 56.

Embodiments of the invention can be implemented to employ speech recognition as an alternate input method. For instance, the design described herein enables a pilot to indicate the desired altitude for the vehicle's near-future path with inputs to the stick 30 and throttle 32. However, the altitude for each directed noodle segment 14 may also be designated with voice commands that are recognized and processed with a speech recognition system.

Other embodiments may be configured to provide a feature that augments the display presentation to include symbology that represents the future path's uncertainty to the operator. This information would include the nature and source of the uncertainty (to include external perturbations from turbulence, etc.), with an indication of how the degree of uncertainty increases with distance and time in the future.

When the invention is integrated into a fully featured control station, it is also possible to rely on local services to review the proposed flight path. These would provide feedback through some mechanism when the directed noodle 14 path would violate established limits, such as minimum altitude terrain clearance and/or encroachment on restricted operating zones.

While the bulk of the discussion contained herein has targeted the application of RPV control, especially for future multi-RPV application, this is just one possible configuration of this invention. The same benefits of visualizing and directing future movement of a vehicle can be applied to ground and seagoing unmanned vehicles as well. Of course modifications would be required for these alternate configurations as the corresponding parameters to be controlled and operating range vary with vehicle type. For example, elevation control is relevant for air and undersea vehicles, but not ground.

It will be appreciated that there is a possibility that the disclosed invention may be applied to future manned aviation applications as well, for both military and civilian next generation flight environments. The invention would enable pilots (or air traffic controllers) to command a short term flight path very rapidly.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Experimental results indicate approximately 10 times more rapid specification of a path for a vehicle, and at the same time results in a more precise approximation to desired complex paths than existing methods, especially in high latency communication/datalink environments where rapid control inputs are infeasible. The current embodiment may control multiple remotely piloted aircraft in simulation, though the invention is equally applicable to any path specification.

This new control methodology has been implemented and tested in several simulation demonstrations/evaluations. In one evaluation, pilots rated this new control interface as a likely aid for future control of multiple RPVs. Specifically, they selected one of the top two favorable ratings on a 5-point scale. The pilots' comments were aligned with their ratings: the concept was described as "very intuitive" and providing a good quick visual representation of the vehicle's future flight path. The pilots indicated that the ability to input the future path of the vehicle with this new automated tool via the stick 30 and throttle 32 manipulation would be very useful. One specific example raised was the ability to quickly reroute a RPV to avoid an area that suddenly became restricted. In fact, a current RPV pilot at Creech Air Force Base commented that he could have used the interface in a mission he had just completed, even though that mission only involved control of a single RPV.

This positive qualitative data is complemented with quantitative data. For example, usability test data indicate a near-term vehicle path can be defined in less than a minute, allowing the operator to turn attention to other tasks while the vehicle moves along the-directed path. Comparing these data with an estimate of time to hypothetically fly the paths suggests a 90% attentional time savings for typical operations (Admittedly, the pilot would still periodically check status of all vehicles even with this new method and would also complete periodic cross checks during some manual flight phases.). Nevertheless, the ability to easily set the complex flight path of one vehicle allows more time to be focused on other vehicles, enhancing supervisory control of multiple RPVs.

Figure 9:
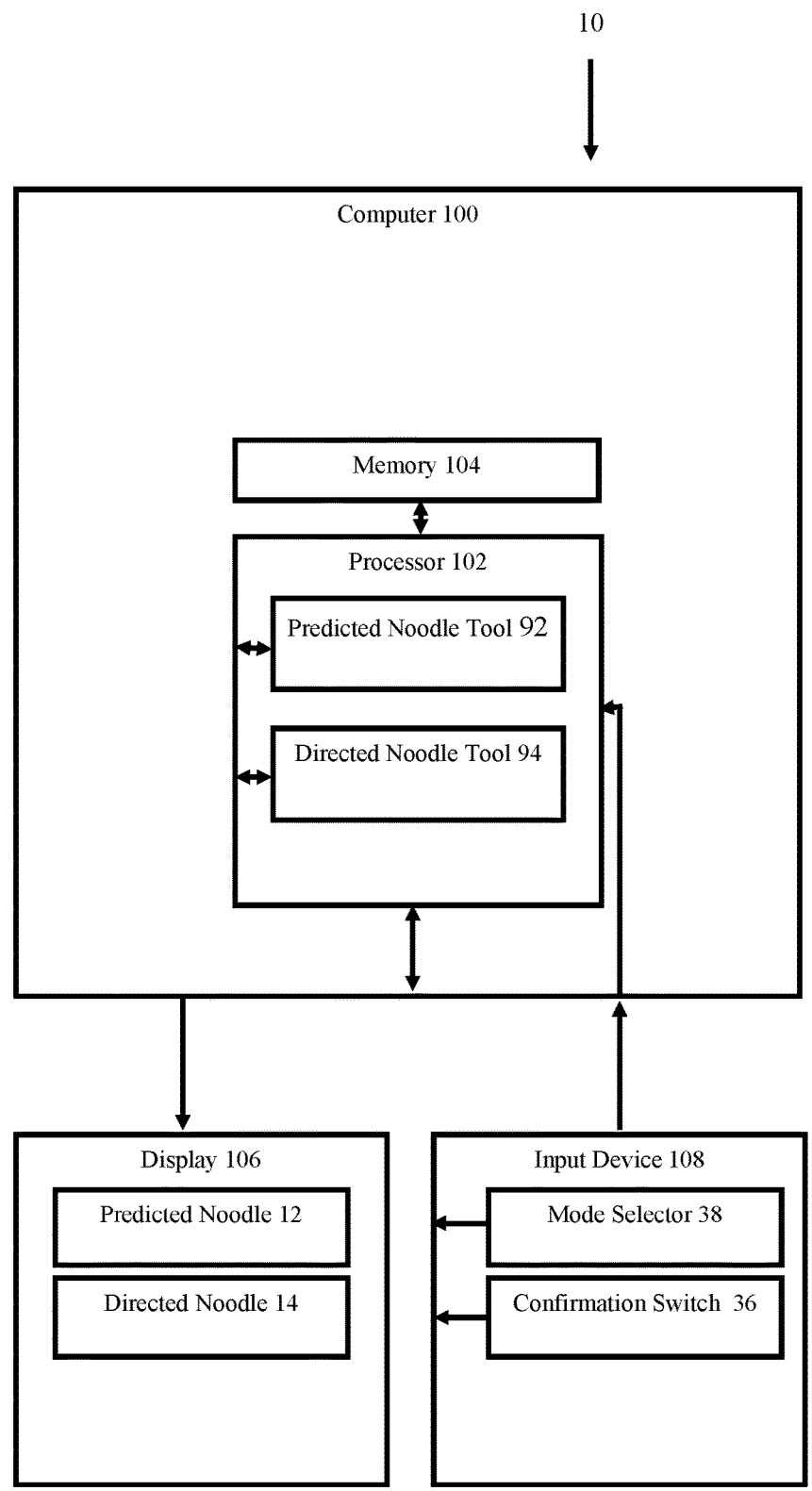
FIG. 9 depicts an exemplary computer configuration for use with embodiments of the disclosed invention.

Calling Attention to FIG. 9, a system embodiment of the disclosed invention 10 is shown. A computer 100 includes a processor 102 and a memory 104. The processor executes the previously described predicted noodle tool 92 and directed noodle tool 94. The computer 100, processor 102 (and in turn, the predicted noodle tool 92, and directed noodle tool 94), receive signals from the input device 108. In particular, the input device 108 further includes the previously discussed mode selector 38 and confirmation switch 36. On example of an input device 108 having a confirmation switch 36 and mode selector 38 was shown in detail via FIG. 2. The processor 102 transmits visual presentations, the predicted noodle 12, and directed noodle 14 on the display 106, in response to signals from the input device 108, and in response to data in the memory (e.g. aircraft maneuverability limitations, environmental conditions, aircraft configuration, etc.).

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A system for automating the control of a Remotely Piloted Vehicle (RPV), the system comprising:
   a computer having a processor and a memory;
   a display operatively coupled to the computer and configured to display a future operating condition of the RPV;
   an input device operatively coupled to the computer;
   a predicted noodle tool executed by the processor and configured to indicate a predicted future path of the RPV by generating a predicted noodle segment on the display;
   a directed noodle tool executed by the processor to indicate a pilot-adjustable proposed future flight path of the RPV by generating a directed noodle segment on the display; and
   an input device mode selector operatively coupled to the processor and configured to selectively map the input device to either manipulate a control surface of the RPV, or to manipulate the directed noodle segment,
   wherein each of the display, input device, predicted noodle tool, directed noodle tool, and input mode selector is configured to interface with a second RPV,
   wherein the input device is configured to manipulate the directed noodle segment corresponding to the second RPV concurrently with the execution of the predicted noodle tool corresponding to the RPV.

2. The system of claim 1, further including a confirmation switch operatively coupled to the processor, wherein a second directed noodle segment is disposed adjacent the directed noodle segment, and wherein the confirmation switch is configured to either commit to, or select for a modification of, the directed noodle segment or the second directed noodle segment.

3. The system of claim 2, wherein the modification comprises deleting.

4. The system of claim 1, wherein the input device is configured to manipulate the directed noodle segment corresponding to the second RPV concurrently with the execution of the predicted noodle tool corresponding to second RPV.

5. The system of claim 1, wherein the input device is configured to manipulate the directed noodle segment corresponding to the RPV concurrently with the execution of the predicted noodle tool corresponding to the RPV.

6. A method of controlling a first Remotely Piloted Vehicle (RPV) and a second RPV, in a system including a computer having a processor and a memory, a display operatively coupled to the computer and configured to display a future operating condition of the first and second RPVs, and an input device operatively coupled to the computer, the method comprising:
   generating on the display a predicted noodle segment indicative of a predicted future path of the first RPV or the second RPV, and flying the first RPV or the second RPV with an autopilot to conform to the predicted future path corresponding to the first RPV or the second RPV;
   generating on the display a directed noodle segment indicative of a proposed future path of the first RPV or the second RPV;
   using an input device mode selector to map the input device to manipulate the directed noodle segment corresponding to the first RPV or the Second RPV;

manipulating the directed noodle segment corresponding to the first RPV or to the second RPV with the input device into a desired future path, and committing to the desired future path by actuating a confirmation switch; and manipulating the directed noodle segment corresponding to the second RPV coincident with execution of the predicted noodle tool corresponding to the first RPV.

7. The system of claim 6, wherein the input device is configured to manipulate the directed noodle segment corresponding to the second RPV concurrently with the execution of the predicted noodle tool corresponding to second RPV.

8. The system of claim 6, wherein the input device is configured to manipulate the directed noodle segment corresponding to the first RPV concurrently with the execution of the predicted noodle tool corresponding to the first RPV.

* * * * *